(12) United States Patent
Tesic et al.

(10) Patent No.: US 12,093,970 B2
(45) Date of Patent: Sep. 17, 2024

(54) IDENTIFYING AND QUANTIFYING SENTIMENT AND PROMOTION BIAS IN SOCIAL AND CONTENT NETWORKS

(71) Applicant: Texas State University, San Marcos, TX (US)

(72) Inventors: Jelena Tesic, San Marcos, TX (US); Lucas Rusnak, San Marcos, TX (US)

(73) Assignee: Texas State University, San Marcos, TX (US)

(*) Notice: Subject to any disclaimer, the term of this patent is extended or adjusted under 35 U.S.C. 154(b) by 168 days.

(21) Appl. No.: 17/435,299

(22) PCT Filed: Apr. 19, 2019

(86) PCT No.: PCT/US2019/028317
§ 371 (c)(1),
(2) Date: Aug. 31, 2021

(87) PCT Pub. No.: WO2020/214187
PCT Pub. Date: Oct. 22, 2020

(65) Prior Publication Data
US 2022/0156767 A1 May 19, 2022

(51) Int. Cl.
*G06Q 30/0202* (2023.01)
*G06N 7/01* (2023.01)
*G06Q 50/00* (2012.01)

(52) U.S. Cl.
CPC ........... *G06Q 30/0202* (2013.01); *G06N 7/01* (2023.01); *G06Q 50/01* (2013.01)

(58) Field of Classification Search
CPC ....... G06N 7/01; G06Q 50/01; G06Q 30/0202
See application file for complete search history.

(56) References Cited

U.S. PATENT DOCUMENTS

| | | | |
|---|---|---|---|
| 2012/0137367 A1 | 5/2012 | Dupont et al. | |
| 2014/0122383 A1 | 5/2014 | Shen et al. | |
| 2015/0120713 A1 | 4/2015 | Kim et al. | |

OTHER PUBLICATIONS

Signed Networks in Social Media—Leskovec et al (2010) (Year: 2010).*

(Continued)

*Primary Examiner* — Deirdre D Hatcher
(74) *Attorney, Agent, or Firm* — Robert A. Voigt, Jr.; Shackelford, McKinley & Norton, LLP

(57) ABSTRACT

A method, system and computer program product for identifying and quantifying sentiment and promotion bias. A set of sentiment as a measure of a group opinion is received, where a sentiment is expressed as a weight associated with an edge between two vertices in a graph. Balanced graphs associated with spanning trees corresponding to multiple views of a signed graph are constructed using the set of sentiments. Scores are assigned for each of the multiple views of the signed graph to determine an influence one group has over another group while maintaining agreement. An inequitable ratio of the assigned scores over agreeable sets of vertices of the signed graph is obtained. Based on the inequitable ratio of the assigned scores over agreeable sets of vertices of the signed graph, a more accurate sentiment bias is identified and quantified in contrast to currently existing sentiment analysis tools.

27 Claims, 11 Drawing Sheets

(56) References Cited

OTHER PUBLICATIONS

SHINE: Signed Heterogeneous Information Network Embedding for Sentiment Link Prediction—Wang et al (2017) (Year: 2017).*
A branch-and-cut algorithm for the maximum k-balanced subgraph of a signed graph—Figueiredo et al (2018) (Year: 2018).*
Extracting Signed Social Networks From Text—Hassan et al (2012) (Year: 2012).*
Recognition algorithms for binary signed-graphic matroids; Papalamprou et al; 2012 (Year: 2012).*
New polynomial-time algorithms for Camion bases; Komei Fukuda et al; 2006 (Year: 2006).*
Combinatorial Optimization: Packing and Covering; G'erard Cornu'ejols; 2000 (Year: 2000).*
International Search Report for International Application No. PCT/US2019/028317 dated Sep. 12, 2019, pp. 1-4.
Written Opinion of the International Searching Authority for International Application No. PCT/US2019/028317 dated Sep. 12, 2019, pp. 1-10.
Akoglu et al., "Graph-based Anomaly Detection and Description: A Survey," arXiv:1404.4679v2, Apr. 28, 2014, pp. 1-68.
Geraud Le Falher, "Characterizing Edges in Signed and Vector-Valued Graphs," Artificial Intelligence, Université de Lille, 2018, pp. 1-133.
Harary et al., "A Simple Algorithm to Detect Balance in Signed Graphs," Mathematical Social Sciences, vol. 1, No. 1, 1980, pp. 131-136.

\* cited by examiner

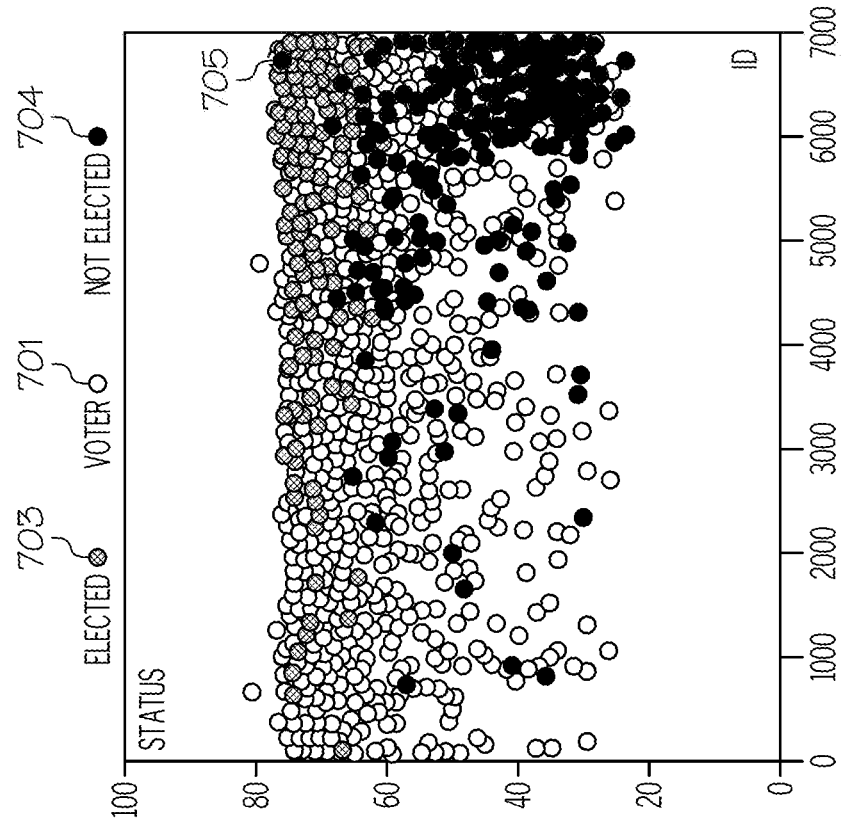
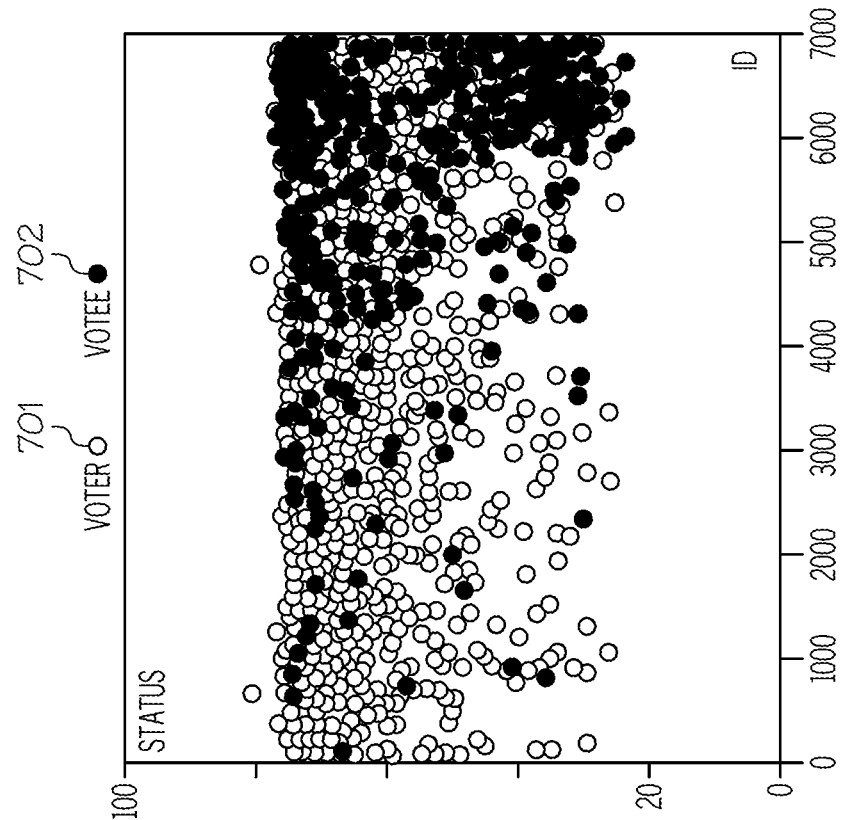
FIG. 7B
FIG. 7A

IDENTIFYING AND QUANTIFYING SENTIMENT AND PROMOTION BIAS IN SOCIAL AND CONTENT NETWORKS

TECHNICAL FIELD

The present invention relates generally to quantifying prediction and fairness in the outcome analysis, and more particularly to predicting promotion and detecting inequity in socio-content networks by analyzing sentiment bias.

BACKGROUND

Computer algorithms are increasingly used to make decisions of significant impact in people's lives, and society is increasingly relying on automated decision making. Due to the sheer nature and noisiness of observational data, data-driven models may systematically disadvantage people, and this may inadvertently happen even if the computing process is fair and well-intentioned.

Sentiment analysis (sometimes referred to as "opinion mining" or "emotion artificial intelligence") refers to the use of natural language processing, text analysis, computational linguistics, statistical and machine learning tools, and biometrics to systematically identify, extract, quantify, and study affective states and subjective information. Sentiment analysis is widely applied to voice of the customer materials, such as reviews and survey responses, topic trending, public opinion expressed online and in social media, and healthcare materials for applications that range from marketing to customer service to clinical medicine.

Promotion analysis refers to the process of identifying unusual promotions and conclusions in the large socio-technical system to unveil fraud, inequity or biased decision-making (e.g., selecting unusual promotions in the company for review; identifying medical billing records for fraud review; identifying the level of promotion based on the peer job levels on the job search sites; identifying dominant groups of decision-makers in social-technical networks). The methodology of the present invention characterizes bias and detects inequity in automatic or manual decision making outcomes. In a socio content network, sentiments reflect (dis)approval of a network characteristic (e.g., team members in the company, student evaluations of a teaching instructor, "trustworthiness" of a product reviewer, etc.). Sentiments have tangible real-world effects (e.g., annual performance scores and promotions in the workforce). Sen-timent relations are associated with the sign of an edge in a graph network. Simple analysis (majority rule) or local analysis of the network has guided the decisions of the final outcome. When the individual outcomes are known, an individual's status may be perceived as elevated or diminished relative to their peers.

Bias is favoritism, nepotism, or some kind of unfair advantage. Various socio-technical networks and algorithms may have implicit or explicit biases ("sentiment biases") when providing information to their subscribers or persons or when evaluating records and personnel for promotion, or billing records for fraud. Generally speaking, a social and content network's bias is not manifested but may be embodied in picking up different subtopics for a topic, or reporting a same event in different tones or attitudes, or choosing the outcome differently than expected. Biased reports convey one-sided information and may consequently lead to wrong opinions or wrong judgments. Amazon product reviews are a popular way to express a sentiment bias as it is to encompass the sentiment of the product seller, manufacturer, or its potential (mis)use.

Attempts have been made to identify and quantify bias in social and content networks; however, such attempts have had limited success in accurately identifying and quantifying such bias. Such attempts to identify sentiment bias involve using sentiment analysis tools. In a social network, sentiments reflect (dis)approval of a network characteristic (e.g., team members in the company, student evaluations of a teaching instructor, "trustworthiness" of a product reviewer, etc.). Sentiments have tangible real-world effects (e.g., annual performance scores and promotions in the workforce). In October 2018, Amazon® had to retire its secret artificial intelligence (AI) recruiting tool. It had been discovered that the tool used artificial intelligence to give job candidates scores like product ratings, and the new system was learning from final outcomes to improve the hiring recommendations. What the system learned was to rate candidates with explicit gender promotion bias.

Hence, there is not currently a way for objectively identifying and quantifying bias in social and content networks. The current tools for identifying and quantifying such bias fail to provide the insight necessary for accurately identifying and quantifying sentiment bias with respect to the perceived balanced state of the system. Additionally, such tools utilize an expansive amount of computing resources (e.g., processing resources).

SUMMARY

In one embodiment of the present invention, a method for detecting inequity in social networks comprises receiving a set of nodes that correspond to users or evaluated content. The method further comprises receiving a set of sentiments between the set of nodes as a measure of a group opinion, where the set of sentiments is expressed as a weight associated with an edge between two vertices in a graph. The method additionally comprises generating a probability graph by constructing all possible balanced graphs associated with spanning trees corresponding to multiple views of a signed graph using the set of sentiments, where the signed graph is a graph in which each edge has a positive or a negative sign, and where the spanning tree is a subgraph that is a tree that includes all the vertices of the signed graph with a minimum possible number of edges. Furthermore, the method comprises assigning scores for each of the multiple views of the signed graph to determine an influence one group has over another group while maintaining agreement. Additionally, the method comprises obtaining an inequitable ratio of the assigned scores over agreeable sets of vertices of the signed graph. In addition, the method comprises identifying and quantifying a sentiment bias based on the inequitable ratio of the assigned scores over agreeable sets of vertices of the signed graph.

Other forms of the embodiment of the method described above are in a system and in a computer program product.

In another embodiment of the present invention, a method for predicting promotion in social networks comprises receiving a set of sentiments, where the set of sentiments corresponds to a measure of a group opinion, and where the set of sentiments is expressed as a weight associated with an edge between two vertices in a graph. The method further comprises constructing multiple alternate balanced versions of a signed graph using the set of sentiments, where the signed graph is a graph in which each edge has a positive or a negative sign. The method additionally comprises generating a vertex probability graph which uses the signed graph to determine a likelihood of promotion of a network node of a social network. Furthermore, the method comprises predicting the promotion of the network node based on the vertex probability graph.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 7A illustrates that voters and candidates separate into upper and lower clusters in accordance with an embodiment of the present invention;

FIG. 7B illustrates the promotion and unpromotion of the voters and candidates in accordance with an embodiment of the present invention;

DETAILED DESCRIPTION

Figure 1:
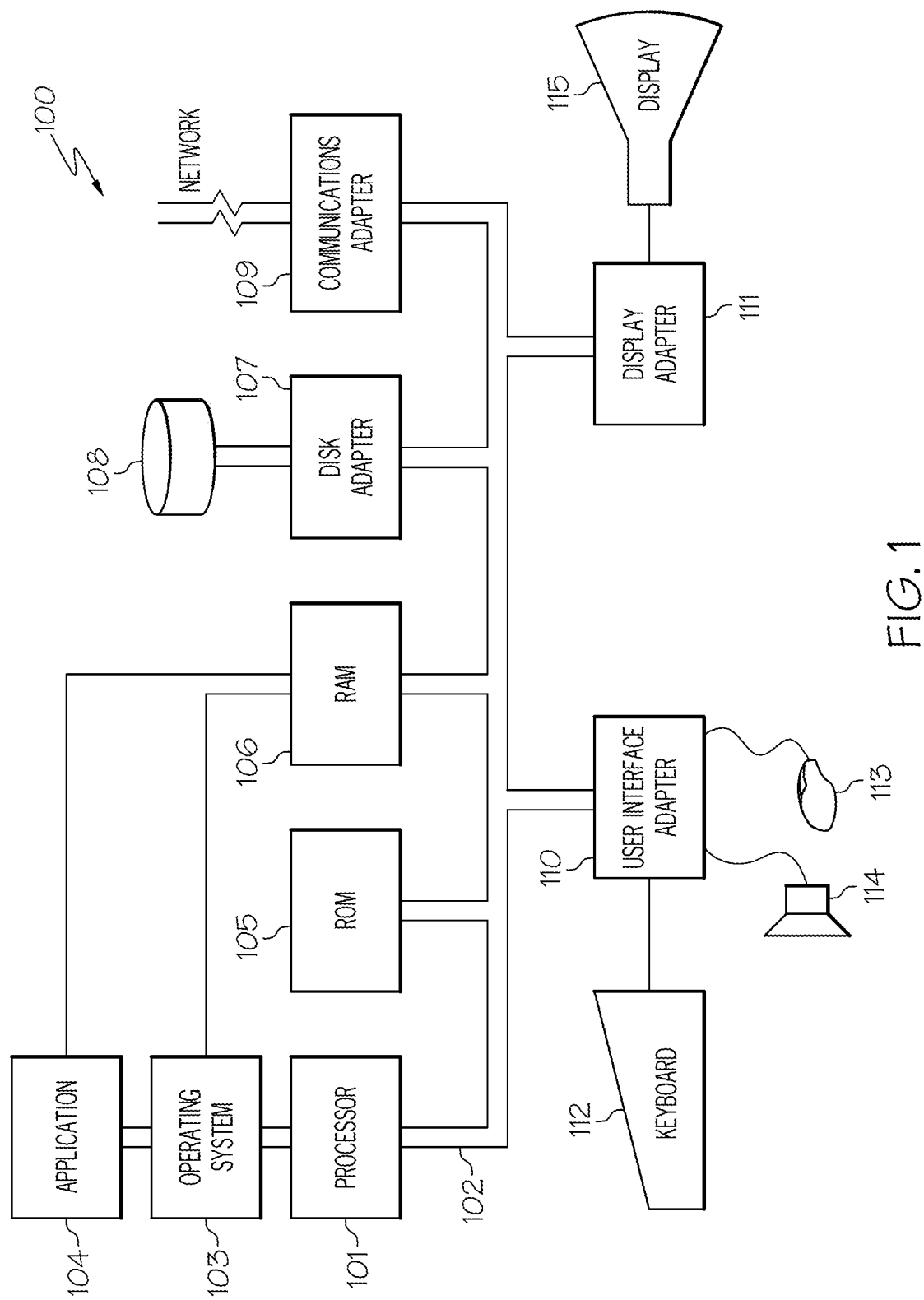
FIG. 1 illustrates an embodiment of the present invention of the hardware configuration of a computing device which is representative of a hardware environment for practicing the present invention.

As stated in the Background section, there is not currently a way for objectively identifying and quantifying bias in social and content networks. The current tools for identifying and quantifying such bias fail to provide the insight necessary for accurately identifying and quantifying sentiment bias with respect to the perceived balanced state of the system. Additionally, such tools utilize an expansive amount of computing resources (e.g., processing resources).

The principles of the present invention aid in identifying and quantifying social influences and flag questionable decisions in an objective manner. Furthermore, the principles of the present invention mine the underlying structure of a big social networking graph to propose the statistically objective consensus of a set of "agreeable realities" to preserve the objectiveness of the approach.

Embodiments of the present invention identify agreeable interpretations of sentiments expressed in social and content networks and help in evaluating aspects, such as the group fairness impact. Furthermore, the present invention may be used for large social, content, behavioral, and bio networks due to its ability to take advantage of parallel data processing capabilities while simultaneously including a variety of topics, such as community detection, node ranking, node classification, and sign prediction in signed graph networks, clustering and classification as part of the analysis.

Embodiments of the present invention seek to apply mathematical sociology theory to group fairness in socio-content and socio-technical networks. Furthermore, embodiments of the present invention use a set of sentiments as one measure of group opinions and construct multiple alternate balanced versions of a given signed graph (referred to herein as "realities"). This enables identification of sets of agreeable interpretations of the sentiments in sociotechnical graph networks and allows for the fairness of group impact evaluation using statistical parity as a measure. In one embodiment, the present invention computes statistical features for a temporal model that captures graph network behavior and trends over time intervals, if time samples are available.

Aspects, such as group fairness, are enforced along with correcting a minimal set of individual sentiments in connected graph views. In various embodiments, verification of agreeable viewpoints is performed using scalable data characterization and statistically significant parity. The graphs generated using the principles of the present invention are analyzed to understand different projections of aggregable groups. Furthermore, embodiments of the present invention assign scores for each reality to determine the influence that one group may have over the other while maintaining agreement. This approach enables the development of an "average reality" (baseline statistical parity) as well as identifying "skewed" realities in the graph.

Sentiment analysis tools in analyzing the sentiment bias in evaluations posted on social networks consider the set of sentiments as a one-time measure of opinions and constructs one balanced version using that data in a given signed graph. Such an analysis is enhanced using the principles of the present invention by constructing multiple alternate balanced versions of a given signed graph using the set of sentiments as one of the measures of the group opinion.

Furthermore, embodiments of the present invention identify and quantify sentiment bias as an inequitable ratio of sentiment scores over agreeable sets of vertices. When applied to examples, such as voting trends, the present invention's approach shows the appearance of a number of edges in the graph that have unexpected sentiment (e.g., negative instead of positive or vice-versa). As a result, the present invention overcomes limitations seen in current analytical treatments by helping identify network bias through the number of unbalanced sentiments that the network has with respect to a given spanning tree.

Referring now to the Figures in detail, FIG. 1 illustrates an embodiment of the present invention of the hardware configuration of a computing device 100 which is representative of a hardware environment for practicing the present invention. Computing device 100 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of identifying and quantifying sentiment bias in social and content networks.

Referring to FIG. 1, computing device 100 may have a processor 101 connected to various other components by system bus 102. An operating system 103 may run on processor 101 and provide control and coordinate the functions of the various components of FIG. 1. A description of the internal architecture of processor 101 is provided below in connection with FIG. 2. An application 104 in accordance with the principles of the present invention may run in conjunction with operating system 103 and provide calls to operating system 103 where the calls implement the various functions or services be performed by application 104. Application 104 may include, for example, a program for identifying and quantifying sentiment and promotion bias in social and content networks as discussed further below in connection with FIGS. 1-6, 7A-7B, 8-9, 10A-10B and 11.

Referring again to FIG. 1, read-only memory ("ROM") 105 may be connected to system bus 102 and include a basic input/output system ("BIOS") that controls certain basic functions of computing device 100. Random access memory ("RAM") 106 and disk adapter 107 may also be connected to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for identifying and quantifying sentiment and promotion bias in social and content networks, as discussed further below in connection with FIGS. 1-6, 7A-7B, 8-9, 10A-10B and 11, may reside in disk unit 108 or in application 104.

Computing device 100 may further include a communications adapter 109 connected to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

Figure 2:
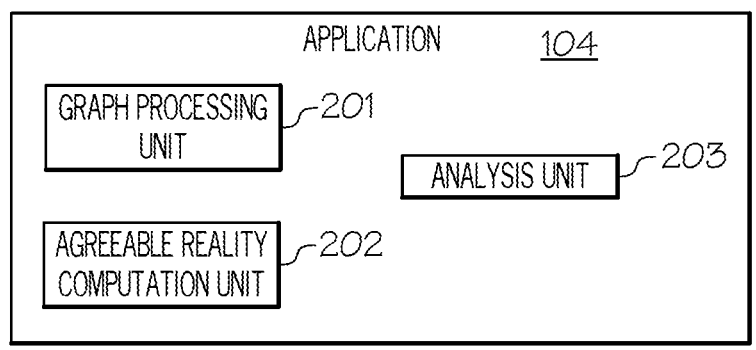
FIG. 2 is a diagram of the software components used in connection with predicting promotion and detecting inequity in socio-content networks by analyzing sentiment bias in accordance with an embodiment of the present invention.

Referring to FIG. 2, FIG. 2 is a diagram of the software components used in connection with predicting promotion and detecting inequity in socio-content networks by analyzing sentiment bias in accordance with an embodiment of the present invention. In one embodiment, these software components may reside in application 104 (FIG. 1).

Referring to FIG. 2, the software components include a graph processing unit 201 configured to translate the socio-technical network into a graph representation. Furthermore, the software components include an agreeable reality computation unit 202 that is configured to generate a probability graph. Additionally, the software components include an analytics unit 203 that includes multiple units of data analysis, where at least one of the units uses the probability graph for analysis. A further description of the functionality of these components is discussed further below in connection with FIGS. 3-6, 7A-7B, 8-9, 10A-10B and 11.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG. 1 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, attempts have been made to identify and quantify sentiment bias; however, such attempts have had limited success in accurately identifying and quantifying such sentiment bias at scale. Bias, and consequently conflict, distrust, controversy, and status in social network analysis have been defined in many different ways. As the scale and complexity of social networks grow, more robust definitions are needed. A very succinct (and non-comprehensive) summary of the current views of the research community is provided in the following paragraphs.

Bias is favoritism, nepotism, or unfair advantage. A node-based version appears where trustworthiness and deserve are examined, as a reflection of expected weights of out- and in-edges. An iterative algorithm is demonstrated to determine trustworthiness and deserve of a node by updating these values and edge weights. Controversy is defined as through random walk controversy, which examines the likelihood a random walk will return to the same side of the network. Embodiments of the present invention improve the examination of triangles by including pendant vertices. A method to reduce controversy by bridge opposing viewpoints is also introduced. Conflict is defined by examining the Laplacian matrix to produce a "Conservation Law of Conflict" reminiscent of Kirchhoff's laws. Trust has been examined to build a belief matrix to iteratively build a propagation matrix by generalizing pathing matrices to reciprocate trust with the possibility of a non-reciprocated distrust. Statistical parity defines balance, or fairness, as statistical convergence of any demographics of the set of individuals receiving any classification is the same as the demographics of the underlying population. In responsible data science research, it has been shown that the latest fairness-preserving algorithms tend to be sensitive to fluctuations in dataset composition and are more brittle than expected.

Embodiments of the present invention identify and quantify sentiment and promotion bias more accurately using fewer computing resources by constructing balanced graphs associated with spanning trees corresponding to multiple views of a signed graph as discussed further below in connection with FIGS. 3-6, 7A-7B, 8-9, 10A-10B and 11. Scores are assigned for each of the multiple views of the signed graph to determine an influence one group has over another group while maintaining agreement. An inequitable ratio of the assigned scores over agreeable sets of vertices of the signed graph is obtained. Based on the inequitable ratio of the assigned scores over agreeable sets of vertices of the signed graph, a more accurate sentiment and promotion bias is identified and quantified.

Figure 3:
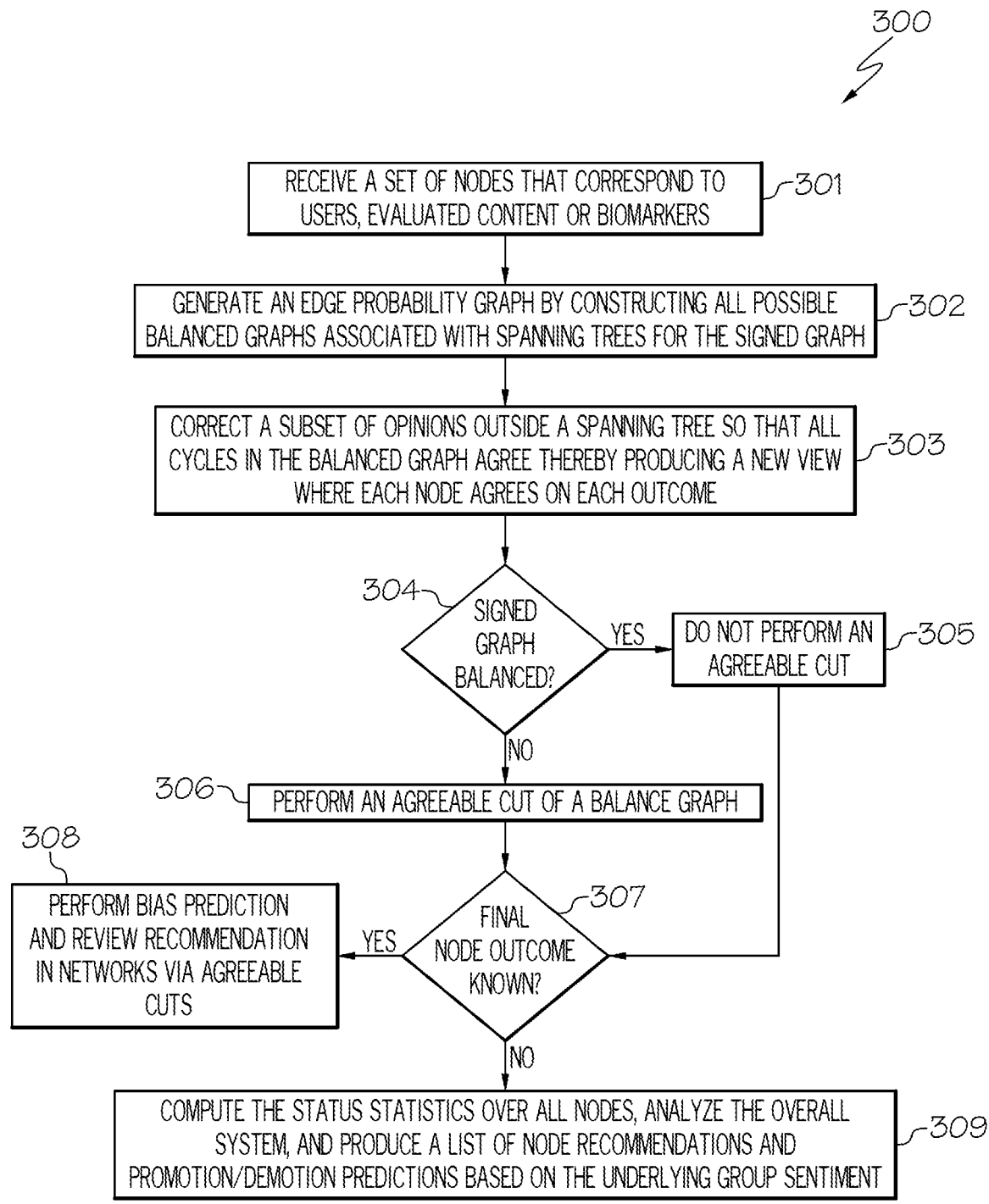
FIG. 3 is a flowchart of a method for quantifying edge sentiment and node status in accordance with an embodiment of the present invention.

FIG. 3 is a flowchart of a method for quantifying edge sentiment and node status in accordance with an embodiment of the present invention.

Figure 5:
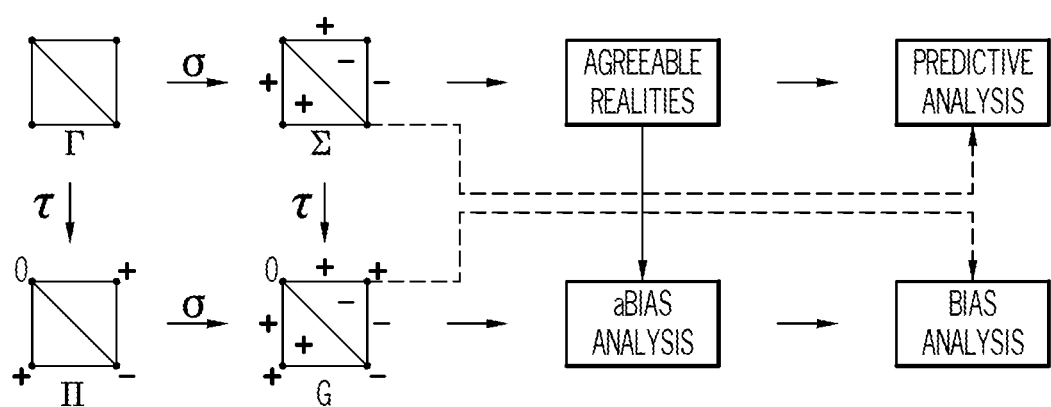
FIG. 5 illustrates that a graph $\Gamma$ is a (V, E) tuple; a signed graph $\Sigma$ is a (V, E, $\sigma$) triple and captures the sentiment of the edges as weights; a promotion graph $\Pi$ is a (V, E, $\pi$) triple and captures the final outcome for the vertex; and an endorsement graph G is the encompassing (V, E, $\sigma$, $\pi$) quartet in accordance with an embodiment of the present invention.

Referring now to FIG. 3, in conjunction with FIGS. 1-2, in step 301, a set of nodes that correspond to users or evaluated content or biomarkers is received. A set of sentiments between the nodes is received as a measure of a group opinion, where the set of sentiments is expressed as a weight associated with an edge between two vertices in a graph. The system generates a signed graph where nodes are users/content/biomarkers and edge weight is sentiment weight as illustrated in FIG. 5 discussed further below. FIG. 5 illustrates that a graph Γ is a (V, E) tuple; a signed graph Σ is a (V, E, σ) triple and captures the sentiment of the edges as weights; a promotion graph Π is a (V, E, π) triple and captures the final outcome for the vertex; and an endorsement graph G is the encompassing (V, E, σ, π) quartet in accordance with an embodiment of the present invention.

Figure 4:
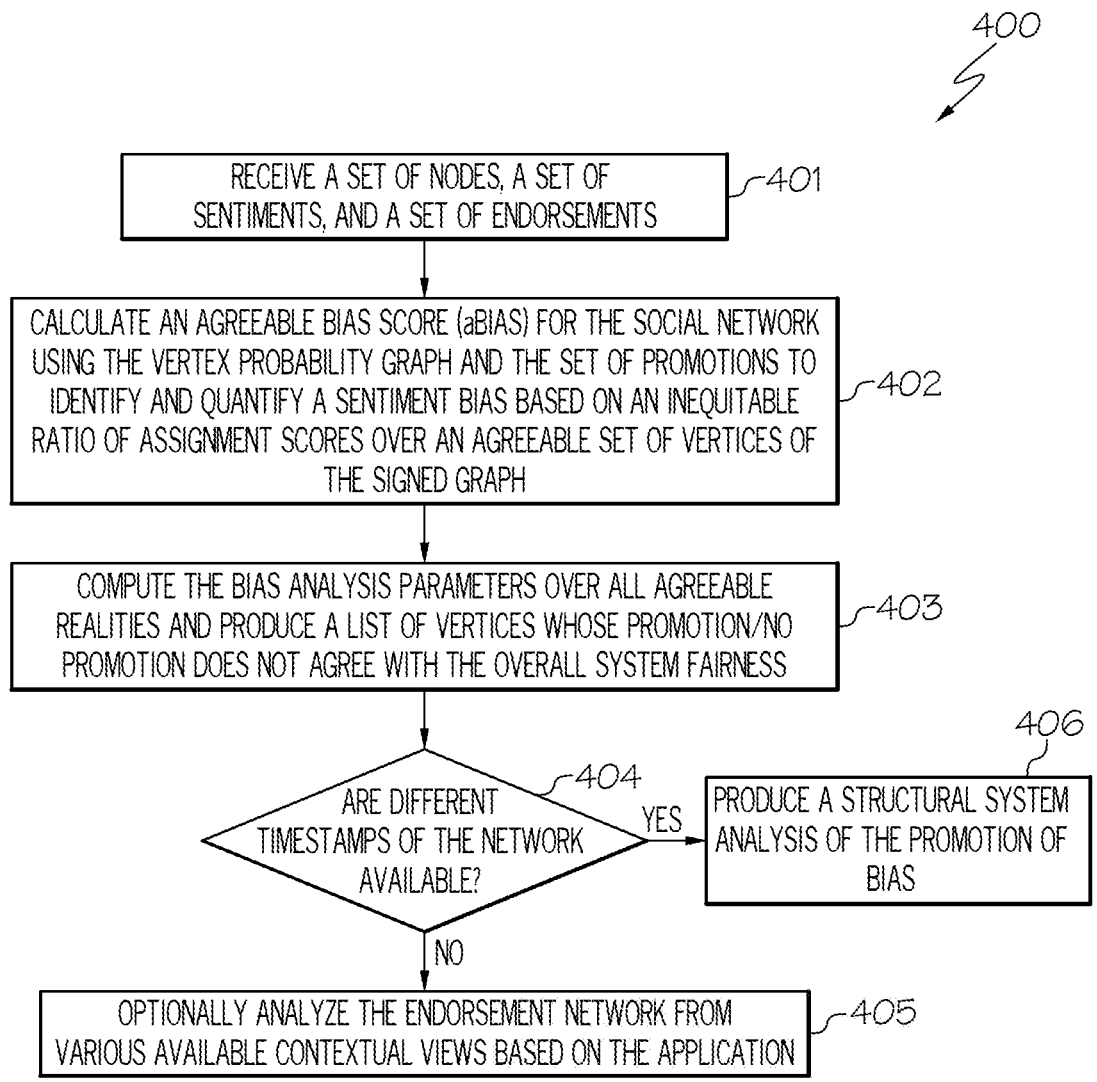
FIG. 4 is a flowchart of a method for bias prediction and review recommendation in networks via agreeable cuts in accordance with an embodiment of the present invention.

In one embodiment, the sentiments are expressed as a weighted edge between two nodes. In one embodiment, the sentiments are correlated to the final state of the nodes in terms of promotion, rating or not a target of promotion as discussed below in connection with FIG. 4. FIG. 4 is a flowchart of a method for bias prediction and review recommendation in networks via agreeable cuts in accordance with an embodiment of the present invention. It is noted that one edge can have multiple sentiment weights: the graph constructed is a hypergraph.

Figure 6:
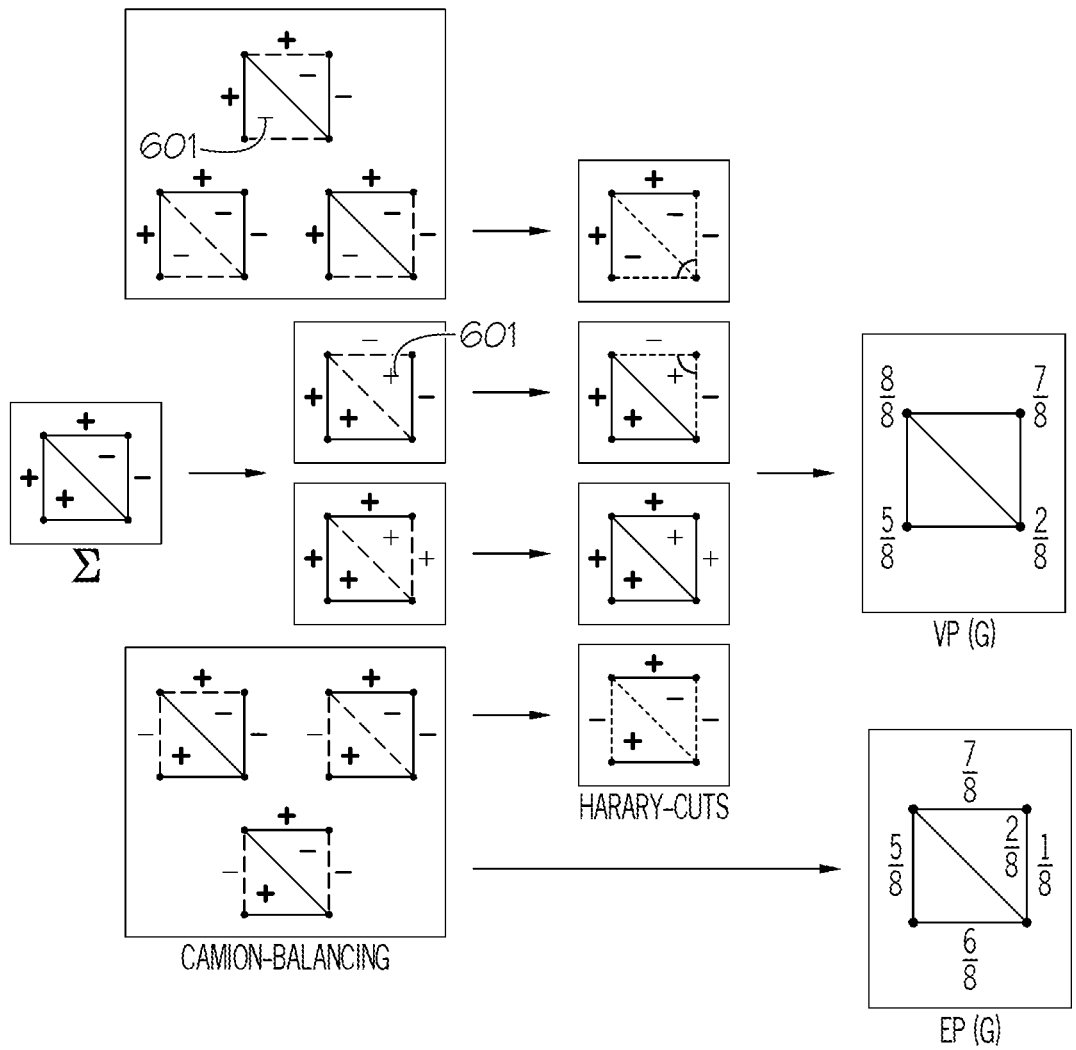
FIG. 6 illustrates an example of determining agreeable realities, the edge probability graph, Harary cuts and the vertex-probability graph from a signed graph $\Sigma$ in accordance with an embodiment of the present invention.

In step 302, an edge probability graph is generated by constructing all possible balanced graphs associated with spanning trees for the signed graph as illustrated in FIG. 6 as discussed further below. FIG. 6 illustrates an example of determining agreeable realities, the edge probability graph, Harary cuts and the vertex-probability graph from a signed graph Σ in accordance with an embodiment of the present invention. In one embodiment, the system constructs all possible balanced graphs associated with spanning trees corresponding to multiple views of a signed graph using the set of sentiments as illustrated in FIG. 6, where the signed graph is a graph in which each edge has a positive or a negative sign, and where the spanning tree is a subgraph that is a tree that includes all the vertices of the signed graph with a minimum possible number of edges. In one embodiment, computations on the edge probability graph are executed to quantify the strength and value of the expressed opinions.

In step 303, a subset of opinions outside a spanning tree are corrected so that all cycles in the balanced graph agree thereby producing a new view where each node agrees on each outcome as illustrated in FIG. 6.

In step 304, a determination is made as to whether the signed graph is balanced.

If the signed graph is balanced, then, in step 305, an agreeable cut is not performed.

If, however, the signed graph is not balanced, then, in step 306, an agreeable cut of a balanced graph is performed. Scores are assigned for each of the multiple views of the signed graph to determine an influence one group has over another group while maintaining agreement. In one embodiment, the system generates a vertex probability graph using all balanced subnetworks as illustrated in FIG. 6: for every node, the system sets a status: likelihood of promotion/agreeable vote of the graph node. In one embodiment, a vertex probability graph is generated by analysis unit 203 using the signed graph to determine a likelihood of promotion of a network node of the social network. In one embodiment, the vertex probability graph is generated for each network node in the two sub-networks based on the number of times the node ended upon in the larger subgraph.

After performing or not performing an agreeable cut, in step 307, a determination is made as to whether the final node outcome is known (voting, promotion, diagnosis, etc.).

If the final node outcome is known, then, in step 308, method 400 is performed for bias prediction and review recommendation in networks via agreeable cuts as discussed below in connection with FIG. 4.

If, however, the final outcomes of the sentiment graph analysis are not known, then, in step 309, the status statistics are computed over all nodes, the overall system is analyzed, and a list of node recommendations and promotion/demotion predictions are produced based on the underlying group sentiment as discussed further below in connection with FIG. 7A. FIG. 7A illustrates that voters and candidates separate into upper and lower clusters in accordance with an embodiment of the present invention.

A discussion regarding bias analysis and review recommendation in social, technical, content, and bio-networks is discussed below in connection with FIG. 4. FIG. 4 is a flowchart of a method 400 for bias prediction and review recommendation in networks via agreeable cuts in accordance with an embodiment of the present invention.

Referring to FIG. 4, in conjunction with FIGS. 1-3, in step 401, a set of nodes, a set of sentiments, and a set of endorsements are received by the system. Endorsement graph representation is generated by graph processing unit 201 using such data as illustrated in FIG. 6 and explained above in connection with method 300 of FIG. 3. The promotion of the network node is predicted by analysis unit 203 based on the vertex probability graph producing a set of promotions. The endorsement graph representation is computed by analysis unit 203 for the received set of promotions for the subset of nodes in the social network and for the received set of sentiments.

In step 402, analysis unit 203 calculates an agreeable bias score (aBias) for the social network using the vertex probability graph (see discussion of step 306) and the set of promotions to identify and quantify a sentiment bias based on an inequitable ratio of assignment scores over an agreeable set of vertices of the signed graph.

In step 403, analysis unit 203 computes the bias analysis parameters over all agreeable realities and produces a list of vertices whose promotion/no promotion does not agree with the overall system fairness.

In step 404, a determination is made as to whether different timestamps (or time slices) of the network (the same socio-technical network) are available.

If different time timestamps are not available, then, in step 405, the endorsement network may optionally be analyzed from various available contextual views (e.g., number of outgoing and/or incoming edges) based on the application. That is, the network analysis may optionally be presented. For example, the network may be analyzed based on any of the contextual clues using the same analysis discussed herein (e.g., node influencers are identified by analysis unit 203 based on their extended influence over the network sentiment over time).

If, however, different timestamps are available, then, in step 406, analysis unit 203 produces a structural system analysis of the promotion of bias.

A more detailed description of the steps of method 300 and 400 is provided further below.

The principles of the present invention disclose a methodology and supporting algorithms for analyzing large social sentiment networks to aid automated decision making in a robust way. The approach of the present invention is applicable also for the sparse graph analysis, and it scales the analysis to the size of the social network. The social graph is analyzed through subsets that are balanced and agreeable. Agreeable outcomes in a graph occur when every local cycle is positive. The present invention includes the steps of defining the fairness score, referred to herein as the "agreeable bias," of a negative-sentiment cut with respect to a spanning tree, and the bias metric is defined in terms of statistical significance over all agreeable realities of an original signed graph. Agreeable realities analyze graphs in terms of varying non-static sentiments to produce agreeable groups in the graph, and agreeable bias is assigned for each reality to determine the influence one group may have over the other while maintaining agreement.

A signed graph consists of a collection of objects (vertices) that are linked together with edges, and each edge receives a sentiment value (+1 or −1 in this case) that expresses the opinion shared between the vertices. Graph theoretic techniques can be applied on the underlying graph, and the properties of the edge-signs themselves allow for sentiment analysis. Fritz Heider considered a pair of friends with a common enemy as a balanced triangle that also represents consensus. Since then it has been used to apply social-psychological theories of balance to social networks. Signed graphs have associated bidirections along individual incidences, where positive edges are coherent and negative edges introduce frustration. Analysis of triangles as a localized representation of structural balance was extended to social networks: edge signs are predicted using a logistic regression model based on the number of triangles connected to each vertex and the number positive edges at each vertex.

In modern psychology, Heider introduced the concept of balance and the theory of attribution. Frank Harary generalized Heider's theory of balance in graph-theoretic terms, allowing for statistical and probabilistic solution approaches. In mathematical sociology, a signed graph is balanced if the sign of each circle is positive, which represents consensus of path-signs between nodes. James A. Davis studied what conditions are necessary and sufficient for the points of a graph to be separated into two or more subsets. There is not a consensus in computer science and behavioral science on how to measure, or even define, bias in Social Network Analysis (SNA), or how to measure the underlying bias of the algorithm. Indré Iiobaité has reviewed bias-aware data science approaches, and proposes a few directions in producing a unifying view of performance criteria when developing new algorithms for non-discriminatory predictive modeling.

The present invention proposes an approach that combines the need for statistical parity to examine bias with the need to include the voice of all nodes by using spanning trees instead of random walks. Then, the approach relies on balance theory to reconstruct the sentiments around a spanning tree to produce the nearest agreeable reality, a balanced sign graph whose sentiments are closest to the original social network for that spanning tree. The method of the present invention produces a measure of agreeable bias for each reality which measures the statistical parity of only those decisions closest to consensus. One contribution is the concept of graph agreeability as a way to observe bias: agreement is achieved by changing, adding or removing edges in the graph. Using signed graph analysis, a method is introduced to map an existing social network graph to a statistically significant set of possible outcomes that are balanced and agreeable. Trends of all possible agreeable outcomes, appropriately named "agreeable realities," are analyzed to characterize bias and inequity of the mean reality arising from all agreeable realities.

With respect to agreeable realities, statistical analysis of agreeable realities is used to overcome the sparsity challenge and (1) identify the anomalous realities that achieve perceived balance and agreement, (2) identify anomalous behavior in the graph (e.g., unexpected "promotion" within a biased system through its set of endorsements), and (3) construct the endorsement probability graph for sign prediction. An edge-probability graph and a vertex-probability graph are produced using versions of the existing graph that predict the likelihood an edge-sentiment is positive (regardless if the edge exists in the original graph) as well as the likelihood a vertex will be promoted.

"Agreeable bias" is the term defined herein to characterize equity in each agreeable reality. Each agreeable reality is analyzed with respect to its agreeable bias score to determine if there is an expected imbalance in promotion. The original signed graph is then assigned the mean of these realities as a more robust way to handle the brittleness of the data space for social network data. Within each agreeable reality, one is able to characterize inequity of promotion. Each reality allows for the tracking of hypothetical outcomes where each decision was coherent. From this, one is able to assign each individual a status as a measurement of their likelihood to be promoted, or affect promotion, over all realities.

It is assumed herein that sentiments are not static, and the data simply represents a single "snapshot" of opinions. To reproduce the nearest sentiment realities with consensus (i.e., balance), Camion's algorithm may be applied for incidence reorientation to the set of spanning trees to re-sign the edges of a signed graph to produce balanced graphs (realities). Bias is examined through inequitable ratios of promotion scores over these agreeable realities to characterize where the social network is subject to "mob mentality" or "minority rule."

An endorsement graph G is a quadruple (V, E, σ, π) that consists of a graph (V, E), an edge-signing function $\sigma:E\rightarrow\{+1, -1\}$, and a vertex-signing function $\pi:V\rightarrow\{0, +1, -1\}$. An endorsement graph's underlying signed graph $\Sigma_G$ is defined as the triple (V, E, σ), and its underlying promotion graph $\Pi_G$ is the triple (V, E, π) as shown in FIG. 5. FIG. 5 illustrates that a graph Γ is a (V, E) tuple; a signed graph Σ is a (V, E, σ) triple and captures the sentiment of the edges as weights; a promotion graph Π is a (V, E, π) triple and captures the final outcome for the vertex; and an endorsement graph G is the encompassing (V, E, σ, π) quartet in accordance with an embodiment of the present invention.

For a set of edges E in an endorsement graph G let E+ (resp. E−) denote the set of positive (resp. negative) edges of G. Similarly, for a set of vertices V in an endorsement graph G let V+ (resp. V− or $V^0$) denote the set of positive (resp. negative or 0) vertices of G. The signs of the edges are regarded as sentiments between two vertices, while the signs of the vertices are regarded as outcomes of promotion. An endorsement graph is balanced if its underlying signed graph is balanced. As discussed above, a signed graph is balanced if every circle is positive. The following theorem (Theorem 1) is then used:

For a signed graph Σ, the following are equivalent:
(1) Σ is balanced.
(2) For every vertex pair (u, w) all u-w-paths have the same sign.
(3) There exists a bipartition of the vertex set into sets U and W such that an edge is negative if, and only if, it has one vertex in U and one in W. The theory is expanded by introducing agreeable realities. Furthermore, algorithms are presented herein to provide a Camion balancing, a Harary bipartition, the edge-probability graph, and the vertex-probability graph.

Sentiment Probability Graph.

Balance theory has been a building block of mathematical sociology for the past seven decades. As indicated in the above-discussed theorem, Harary described how balance theory can predict coalition formation. If a signed graph is balanced, there will be a tendency for the status quo. If it is not balanced, one should examine each of the bonds between pairs in a cycle with regard to relative strength in the situation.

---
Algorithm 1: Camion-Balancing Algorithm
Algorithm 1 Camion-Balancing Algorithm
---

Input: Input signed graph $\Sigma$
Input: Select $T \in \mathcal{T}$, T is a spanning tree of $\Sigma$
   for all edges e, e $\in \Sigma$, e $\notin$ T do
     if fundamental cycle e + T is negative then
       change edge sign: $e^- -> e^+$ ; $e^+ -> e^-$
     end if
   end for
   Construct new signed graph $\Sigma$
Output: Balanced Graph B($\Sigma$) for spanning tree T

---

In social network analysis (SNA), balanced triangles are examined as an adaptation of the Heider Theory to allow "the enemy of my enemy is my friend" paradigm. To include the missing pendant vertices, a random walk model was proposed to examine the likelihood a random walk would return to its favorite side. In one embodiment, the principles of the present invention examine spanning trees since (1) they represent a basis of the underlying graphic matroid, hence, they provide a full sampling of each vertex, (2) Camion's algorithm utilizes a spanning tree to produce a balanced graph to construct the agreeable realities, and (3) each balanced graph has a unique Harary cut of all negative edges which produces a bipartition of the graph into two groups of differing opinions (see above Theorem 1). Algorithm 1 presents how Camion's algorithm utilizes a spanning tree to produce a balanced graph to construct the agreeable realities. Camion's algorithm effectively runs on the incidence graph. As a result, in one embodiment, the algorithm is used for a balanced bipartition of the signed social network graph.

The set of spanning trees of a connected endorsement graph G is denoted as T. The number of spanning trees is called the tree-number of the graph TreeNum(G), and is equal to any first cofactor of the Laplacian of the underlying graph (i.e., by omitting the edge weights).

$$|\mathcal{T}|=\text{TreeNum}(G)=(-1)^{i+j}\det(L_{ij}).$$

The edge-probability graph EP(G) is the graph obtained by assigning to each edge the ratio of the number of times an edge appears positive in a Camion balancing over all spanning trees T($\Sigma$) in the underlying signed graph $\Sigma$ of the endorsement graph G. In one embodiment, the Camion's balancing algorithm is applied to all T∈T. This process is outlined in FIG. 6. FIG. 6 illustrates an example of determining agreeable realities, the edge probability graph, Harary cuts and the vertex-probability graph from a signed graph $\Sigma$ in accordance with an embodiment of the present invention. An underlying signed graph is input and spanning trees are found (indicated in bold). The edges outside a spanning tree (indicated as dashed) are reintroduced with a sign such that the resulting fundamental cycle is positive (edges whose signs change are indicated in shade 601). The ratio of the number of times an edge appears positive over all balancings is then assigned to each edge to produce the edge predictor graph EP(G). The edge-probability graph can be interpreted as the likelihood of an edge of a sentiment graph is positive, and can be used in recommender systems for edge-sign prediction.

---
Algorithm 2: Edge Probability Graph
Algorithm 2 Edge Probability Graph
---

Input: Input signed graph $\Sigma$ and all of its spanning trees
   for all T $\in \mathcal{T}$, T is a spanning tree of $\Sigma$ do
     Run Camion-Balancing Algorithm, see Alg. 1
     Result Balanced Graph B($\Sigma$) for spanning tree T
     for all e $\in$ B($\Sigma$) do
       if e $\in E^+$ then $c_e$ + +.
     end for
   end for
   $\forall e.\text{ep}(e) = c_e/\text{TreeNum}(G)$
Output: Edge Probability graph EP(G) = (V, E, ep(e))

---

The notion of psychological balance and attribution theory are expanded from mathematical sociology to social graph analysis and produce a balanced representation of the perception of reality. In graph theory, a cut is a partition of the vertices of a graph into two disjoint subsets, which determines a cutset—the set of edges that have one endpoint in each subset of the partition. The algorithm of the present invention produces cutsets of negative edges that arise from agreeable balanced states. Such cutsets are denoted as (aMaj, &Win). aMaj is short for agreeable majority, and it represents the larger partition set of the cut. aMin is short for agreeable minority, and it represents the smaller (or equal sized) partition set of the cut. Agreeable cutsets are obtained by Camion's algorithm by correcting a minimal number of sentiment edge-signs, where the resulting set of negative edges form a Harary bipartition. The output (aMaj, aMin) of Algorithm 3 (see below) is called the minimally agreeable cut, (MAC), with respect to tree T—this is to emphasize that MAC(T) represents a minimal set of edge-signs that need to be reversed to produce agreement for a given spanning tree T. MAC(T) represents one agreeable reality of $\Sigma$, and its associated spanning tree T is an anchor for that reality. The set of agreeable realities can be used to provide a measure of status for each vertex by calculating the chance a vertex belongs to aMaj(T). The vertex probability graph VP(G) uses the underlying signed graph to determine the likelihood of promotion (without knowledge of the vertex promotion function $\pi$). VP(G) is the graph obtained from Algorithm 4 (see further below) by assigning to each vertex the ratio of the number of times a vertex is in an agreeable majority aMaj(T) over all spanning trees. FIG. 6 illustrates this process by removing the negative edges to produce the Harary bipartition (indicated as dotted). The labels of each vertex in VP(G) are called the status of the vertex with respect to tree T.

---
Algorithm 3: Harary-Cutset Algorithm
Algorithm 3 Harary-Cutset Algorithm
---

Input: $\Sigma$ - input signed graph
   for all T $\in \mathcal{T}$, T is a spanning tree of $\Sigma$ do
Input: Camion-balancing Algorithm, see Alg.1
     for all edges e $\in$ B($\Sigma$) do
       if e $\in E^-$, cut it
     end for
     Form two partitions $C_0$(T) and $C_1$(T)
     if $|C_0(T)| < |C_1(T)|$ then
       swap partition notation so that $C_0$(T) is larger partition
     end if
     aMaj(T) = $C_0$(T), aMin(T) = $C_1$(T)
Output: MAC(T) = (aMaj(T), aMin(T))
   end for

```
Algorithm 4: Computing Vertex Probability Graph
Algorithm 4 Computing Vertex Probability Graph Input: G - input endorsement graph
   for all T ∈ 𝒯 , T is a spanning tree at G do
      Run Harary-Cutset Algorithm (Alg. 3 for Σ. T 3
      Result MAC(T) = aMaj(T), aMin(T)
      for all vertices υ, υ ∈ Σ do
         if υ ∈ aMaj(T) then
            increase count for that vertex by one, c_υ + +.
         end if
      end for
   end for
   status(υ) = υp(υ), υp(υ) = c_υ/TreeNum(G)
Output: Vertex Probability Graph VP(G) = (V , E, status(υ))
```

Bias in an endorsement graph G is measured as an inequity of promotion within each vertex bipartition. This inequity is then restricted to agreeable realities as they represent the underlying balanced signed graphs nearest to G.

Bias and Inequity in Endorsement Graph

Let G be an endorsement graph as defined above. The signs of the vertices are regarded as outcomes of promotion (+ is promoted, − is not promoted, and 0 determine promotion) as shown in FIG. 5. Let (U, W) be a non-trivial bipartition of V, with U+ (W+) the set of positive vertices of U (W), V− (W−) the set of negative vertices of U (W), and $U^0$ ($W^0$) the set of static vertices of U (W). An endorsement graph is unbiased if for every non-trivial bipartition (U, W) of vertices, one has:

$$\frac{|U^+|}{|U^+|+|U^-|} = \frac{|W^+|}{|W^+|+|W^-|}. \quad (1)$$

An unbiased endorsement graph has an equal ratio of endorsements (+) and demotions (−) across all vertex partitions—a definition of an equitable distribution of promotions across all subgroups.

Theorem 2. Let G be an endorsement graph and (U, W) be a bipartition of the vertex set V. The following are equivalent in an unbiased endorsement graph G:

$$\frac{|U^+|}{|U^+|+|U^-|} = \frac{|W^+|}{|W^+|+|W^-|}. \quad (1)$$

$$\frac{|U^-|}{|U^+|+|U^-|} = \frac{|W^-|}{|W^+|+|W^-|}. \quad (2)$$

$$\frac{|U^+|}{|U^-|} = \frac{|W^+|}{|W^-|}. \quad (3)$$

Proof. The equivalence of (1) and (2) comes from the fact that $$\frac{|U^+|}{|U^+|+|U^-|} + \frac{|U^-|}{|U^+|+|U^-|} = \frac{|W^+|}{|W^+|+|W^-|} + \frac{|W^-|}{|W^+|+|W^-|} = 1. \quad (2)$$

Given (1) and (2), (3) is equivalent by dividing.

The bias of (U, W) for endorsement graph G, bias(U, W; G), is defined as:

$$\text{bias}(U, W; G) = \det \begin{bmatrix} \frac{|U^+|}{|U^+|+|U^-|} & \frac{|W^+|}{|W^+|+|W^-|} \\ \frac{|U^-|}{|U^+|+|U^-|} & \frac{|W^-|}{|W^+|+|W^-|} \end{bmatrix}.$$

Observe that from the proof of Theorem 2, the columns sum to 1, so this is a stochastic matrix and bias(U, W; G)∈[−1, +1]. From this, one has the following result:

Theorem 3. Let G be an endorsement graph.

$$\text{bias}(U, W; G) = 0 \text{ if, and only if, } \frac{|U^+|}{|U^+|+|U^-|} = \frac{|W^+|}{|W^+|+|W^-|}. \quad (1)$$

$$\text{bias}(U, W; G) = 1 \text{ if, and only if, } U^- = \emptyset \text{ and } W^+ = \emptyset. \quad (2)$$

$$\text{bias}(U, W; G) = -1 \text{ if, and only if, } U^+ = \emptyset \text{ and } W^- = \emptyset. \quad (3)$$

Proof. Let G be an unbiased endorsement graph. From parts (1) and (2) from Theorem 2, the columns of the matrix in the bias calculation are equal so the determinant is 0. Parts (2) and (3) follow from the fact that the matrix is stochastic and that $$\frac{|U^+|}{|U^+|+|U^-|} = 1 - \frac{|U^-|}{|U^+|+|U^-|},$$

$$\frac{|W^+|}{|W^+|+|W^-|} = 1 - \frac{|W^-|}{|W^+|+|W^-|}.$$

Thus, a bias of 0 is equivalent to the ratio of endorsements and demotions are the same for both components. A bias of +1 (resp. −1) is equivalent to the set U (resp. W) containing all the endorsements and none of the emotions. The bias of an endorsement graph G, bias(G), is:

$$\text{bias}(G) = \frac{1}{2^{|V|}} \sum_{U \subseteq V} \text{bias}(U, \overline{U}). \quad (3)$$

It is noted that the sum is over all bipartitions (U,Ū) of vertex set V.

While equity of promotion provides a measure of bias of subsets of vertices, it does not include individual edge-sentiments. As a result, the edge sentiments are included by taking a spanning tree that is then used to produce a balanced graph by Algorithm 1. This produces a version of the signed graph in which consensus is simulated by correcting a minimal number of edge-sentiments. Moreover, since each balance graph has a unique bipartition of its vertices along its Harary cut, those bias scores are measured that are closest to agreement along the spanning trees.

The set of spanning trees of a connected endorsement graph G is denoted as T. For each T∈τ let MAC(T) be the associated minimally agreeable cut whose Harary bipartition of V is (aMaj(T), aMin(T)). The agreeable bias of an endorsement graph G, aBias(G), is defined as $$aBias(G) = \frac{1}{|\mathcal{T}|} \sum_{T \in \mathcal{T}} \text{bias}(aMaj(T), aMin(T); G), \quad (4)$$

where the sum is over all spanning trees of G, and (aMaj(T), aMin(T)) are defined above.

FIGS. 5 and 6 indicate how to determine the aBias for trees of an endorsement graph G with underlying signed graph Σ. A detailed algorithm is presented in Algorithm 5. First, the Harary cuts are determined as in FIG. 6, then the bias is calculated for those cuts using the endorsement graph from FIG. 5 and Eq. 3. The value aBias(G) is then calculated as the average of these bias values resulting from spanning trees, as shown in Eq. 4, and the steps are outlined in Algorithm 5

---

Algorithm 5 Agreeable Bias for Endorsement Graph Network

Input: G - input endorsement graph
  for all T ∈ $\mathcal{T}$ , T is a spanning tree of G do
    Run Harary-Cutset Algorithm for (G, T), see Alg. 3
    use (aMaj(T), aMin(T)) to calculate bias as in Eq. 3
  end for
Output: aBias using all bias(aMaj(T), aMin(T)(G), as in Eq 4.

---

Social sentiment is expressed towards another person (e.g., trust-worthiness) or object (e.g., recommendation), and represented in underlying graph analysis as a direct graph. The data forms a directed graph with edges directed from voter to candidate/item, and that can be expressed in a signed adjacency matrix A. Due to the lack of candidate to voter reciprocity, the present invention focuses on goal-oriented analysis of the underlying graph, and different subgraphs reflect that. This is accomplished by symmetrizing the data and considering the matrix $A+A^T$ that corresponds to the signed adjacency matrix of the underlying signed graph. The analysis of the present invention focuses clearly on the directed nature of the relationship, and the directed graph can be reconstructed from the signed graph representation or SNA context.

Unbiased Selection of Spanning Trees: The number of spanning trees, TreeNum(G), is manageable for the small graphs, but for practical SNA analysis it is unfathomable. If |V| is the number of vertices, then the maximum number of spanning trees is $|V|^{|V|-2}$, and is achieved for complete graphs. For a complete graph with 50 vertices that number is $50^{48}$=3.56e+81. Given the concerns of calculating all spanning trees (O(|V||E|)) and balancing along fundamental cycles (O(|V|²|E|)/log(|V|)), a random sample of the spanning trees of G is taken. In one embodiment, the use of the Randomized Minimum Spanning Tree (RMST) method is used to overcome this issue. RMST uses a smaller curated sample set, as it is designed to capture the diversity of potential realities. RMST consists of 3 steps: (1) assign random set of weights to all edges in the connected component; (2) return minimum spanning tree for that set of edges using NetworkX implementation minimum_spanning_tree; and (3) repeat as many times as the computing system allows.

A minimum spanning tree (MST) is a spanning tree of a weighted graph G whose total edge weights is minimal in the set of all spanning trees. If $\tau_n$ be a random sample of n spanning trees of G, aBias(G) is estimated as follows:

$$aBias(G) \approx \frac{1}{|\mathcal{T}_n|} \sum_{T \in \mathcal{T}_n} bias(aMaj(T), aMin(T); G).$$

It is noted that this normalized sum converges to aBias(G) as n→∞.

The definition and construction of the aBias score, as described above, drives how systems are grouped based on the exhibited bias:

An unbiased system will have the distribution of voting, promoted, and unpromoted vertices be identical, with a given vertex appearing in aMaj 50% of the time and the status of all vertices would be 0.5.

A low-biased system is a real-word realization of theoretical unbiased system, and the status for each vertex would be in proximity of 0.5, with an average status close 0.5 for each of the voting, promoted, and unpromoted vertices.

A biased system exhibits a stratification of voting, promoted, and unpromoted vertices based on their status with the status of promoted (unpromoted) vertices having the highest status in a positively (negatively) aBiased network.

Individual vertices are examined by their status (e.g., percent membership to aMaj, as outlined in Algorithm 4). How to use status (y-axis) data for recommendation (FIG. 7A) and stratification (FIG. 7B) purposes is shown in FIGS. 7A-7B, as the status produces a stratification shown in FIG. 7A. FIG. 7A illustrates that voters 701 and candidates 702 (votees) separate into upper and lower clusters in accordance with an embodiment of the present invention. That is, FIG. 7A illustrates that voters (701) and candidates (702) separate into upper and lower clusters in accordance with an embodiment of the present invention. FIG. 7B illustrates the promotion and unpromotion of the voters 701 and candidates 702 in accordance with an embodiment of the present invention. That is, FIG. 7B illustrates the promotion and unpromotion of the voters 701 and candidates 702 in accordance with an embodiment of the present invention. When the actual promotions are known promoted (elected) (703), and not promoted (not elected) (704), as shown in FIG. 7B, the definition of status is an accurate predictor of promotion that detects and corrects for the large-group bias of "mob mentality." This analysis is then used to identify promotion outliers—such as the unpromoted vertex 705, in the upper right corner in FIG. 7B. In this case, the data represents a sample of Wikipedia® adminship election data.

The principles of the present invention take a given signed graph and treat it as an evaluation of a set of possibilities based on the way a balanced graph is reconstructed. In one embodiment, the principles of the present invention use an oriented hypergraphic model to generalize balance algorithms to find the overlap between graph theory and matrix theory.

With respect to the notion of skewed sampled realities when balancing and statistical bounds on graph analysis, each spanning tree produces a different balanced oriented hypergraph. Each of these balanced hypergraphs represents a basis in which the represented nodes perceive each other, and the algorithm corrects the remaining viewpoints to agree with this basis. This presents an assortment of valid realities (views) which are all true from a certain trees point of view. These realities (views) are used to study the original network (with sentiment scores from some group). If the network is graphic this induces a partition of nodes into two agreeable groups (Harary's Bipartition Theorem), which are also studied for their clustering properties. It is noted that the set of corrections (or a statistically relevant sampled set if the data set is large) is analyzed and that the corrected versions are compared to the original. This allows for node ranking and edge prediction in addition to the clustering tasks.

Furthermore, the approach of the present invention can be extended to n-ary vertex relations and clustering (e.g., product rating or manager rating 0-10) as the principles of the present invention cover hypergraphs. The principles of the present invention cover network graphs, where sentiment between two vertices can be expressed as n-modal (e.g., as used in content ratings). It is noted that the principles of the present invention cover multiple clusters as the balancing approach is used to identify $C_0$ and $C_1$ components top down, and define clusters in a hierarchical manner.

Additionally, the principles of the present invention connect matrix theory and graph theory for sentiment network analysis. In one embodiment, the characterization of matroidal bases of signed graphs is used. "Matroid," as used herein, is a structure that abstracts and generalizes the notion of linear independence in vector spaces. In one embodiment, the application of matroidal bases of signed graphs is used for sentiment network analysis.

In one embodiment, individual trees realities are assigned bias scores based on their ratio of wins and losses in each partition. This allows for the identification of an average reality as well as the identification of any outliers that may arise in node-to-node interactions.

Figure 8:
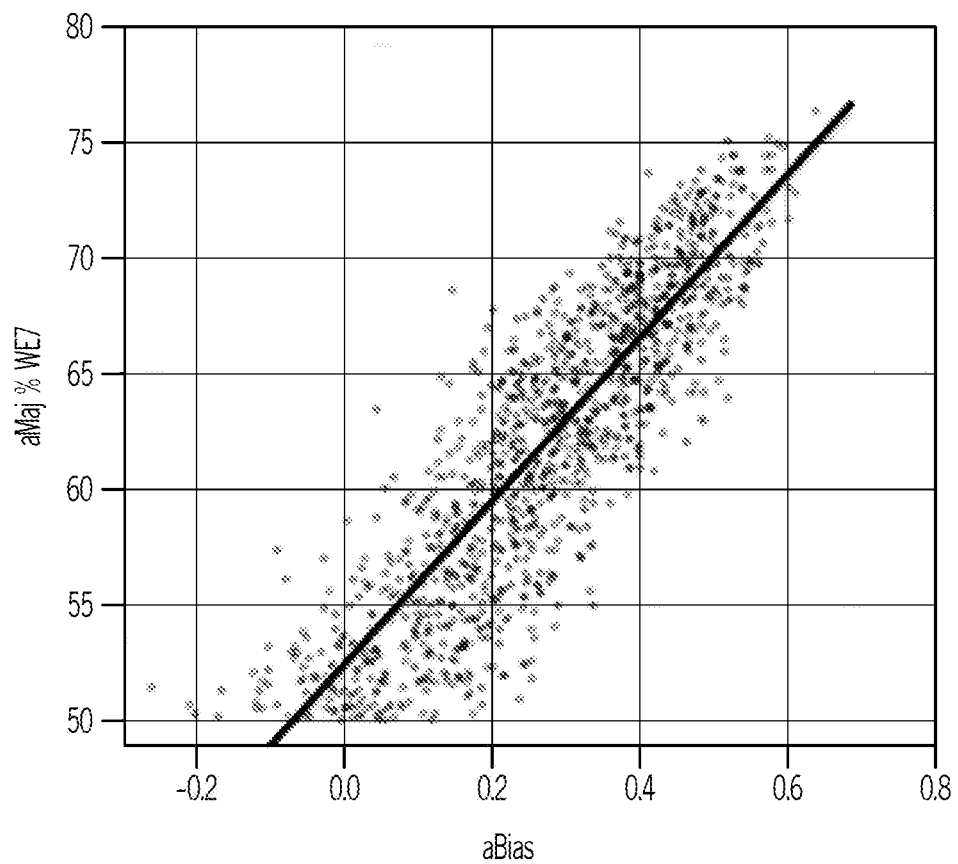
FIG. 8 is a correlation plot of aMaj and aBias for the same election in accordance with an embodiment of the present invention.

In one embodiment, factors of agreeable bias and the agreeable majority are quantified to measure the deviations in sentiments that produce agreeability. This provides a "global" view on the bias of the data based on how close to having consensus. The election outcomes are then introduced to demonstrate that the likelihood of promotion is strongly correlated to the number of agreeable majorities they belong to across all sampled realities, i.e., their status, as illustrated in FIG. 8. FIG. 8 is a correlation plot of aMaj and aBias for the same election in accordance with an embodiment of the present invention. By examining the changes in the average status of promoted, unpromoted, and voting groups and comparing them to the aBias of the election cycle, one is able to identify factors that are major contributors to changes in aBias. A change in aBias can be tracked by an increase or decrease in stratification of high-status "haves" and low-status "have-nots," or by the mean status converging or diverging from the center status. Variables can be, but not limited to: the number of pendant vertices in the agreeable majority within an agreeable reality; the average degree of all non-pendant vertices in the spanning tree of an agreeable reality; the total number of sentiments changed in an agreeable reality; the subset of sentiment changes that switched from positive to negative; and the subset sentiment changes that have switched from negative to positive.

Figure 9:
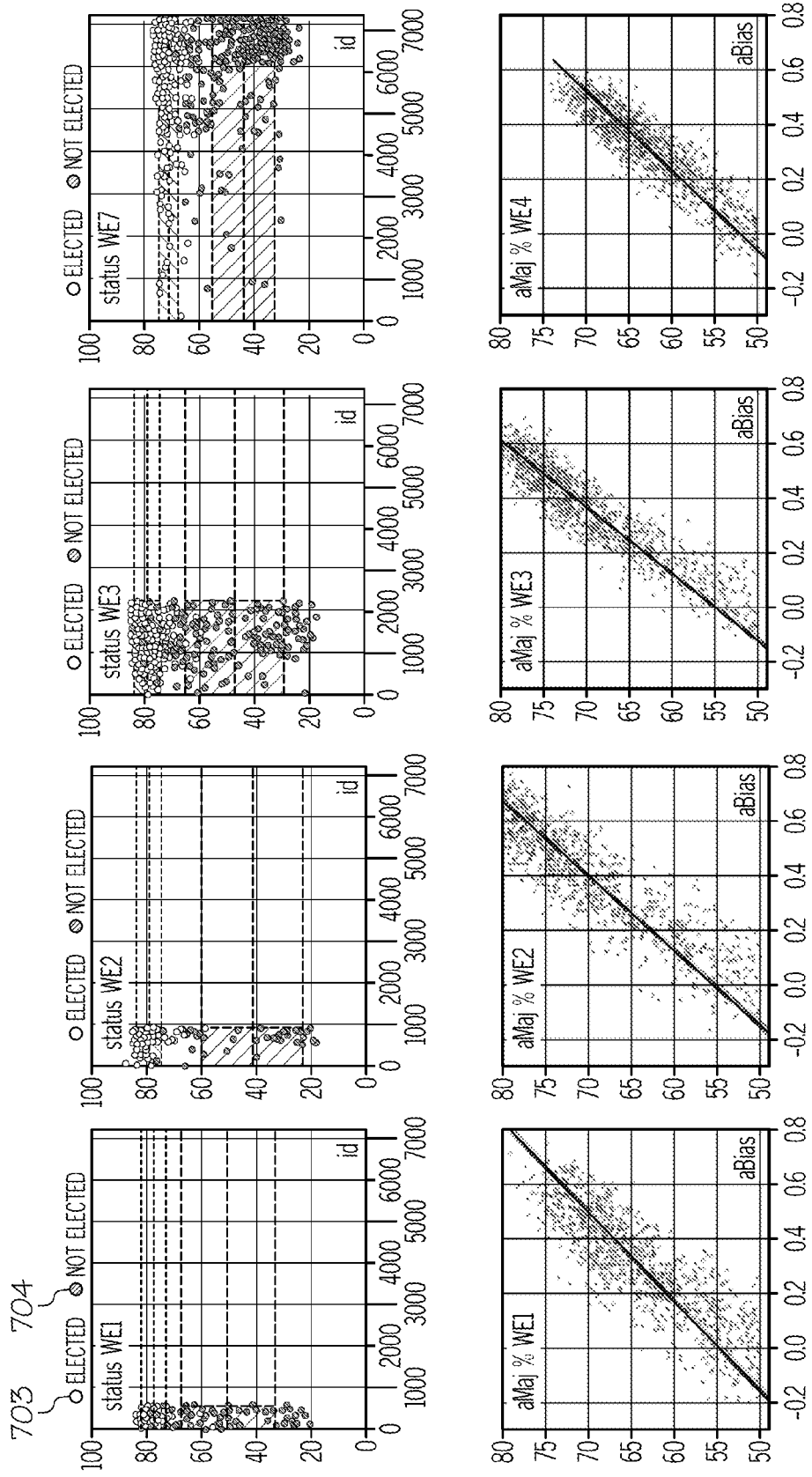
FIG. 9 illustrates the time slices of the dataset, Wiki admin election, that shows that aBias and aMaj are highly correlated in accordance with an embodiment of the present invention.

FIG. 9 illustrates the time slices of the dataset, Wiki admin election, that shows that aBias and aMaj are highly correlated in accordance with an embodiment of the present invention. FIG. 9 illustrates that the change of the promotion and rejection window as one standard deviation of status for elected (703) and not-elected (704) candidates in the election cycle. A decrease in positive aBias from one time point of the network to another results in a homogenization of high-status promoted and not promoted candidates, and with the mean status converging closer to 0.5 for all status means.

Figure 10A:
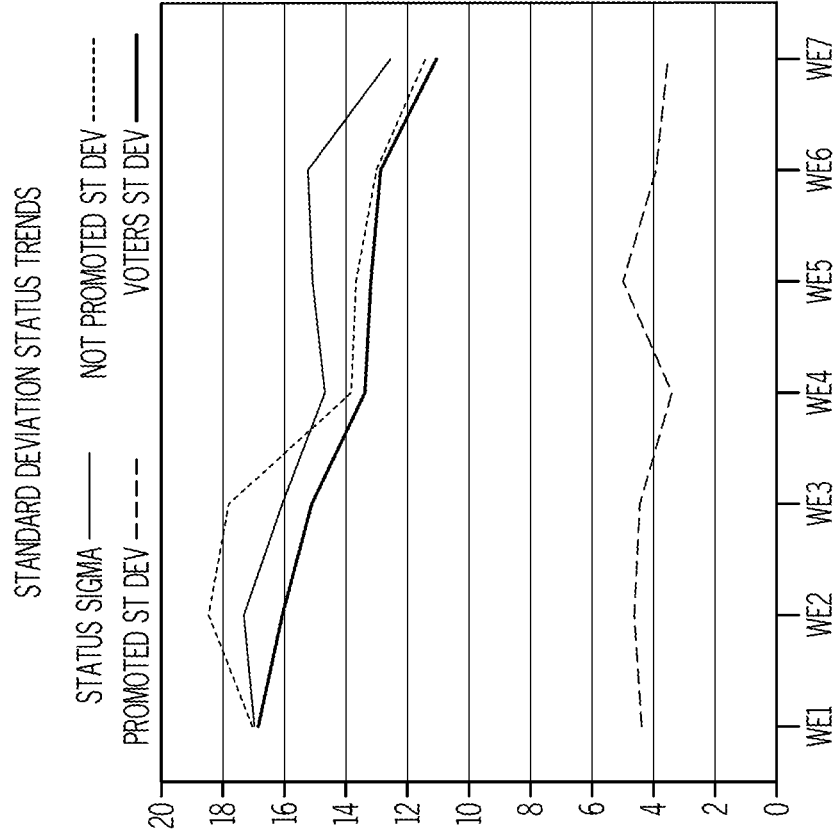
FIGS. 10A and 10B illustrate the status trends and the standard deviation status trends, respectively, in accordance with an embodiment of the present invention.
Figure 10B:
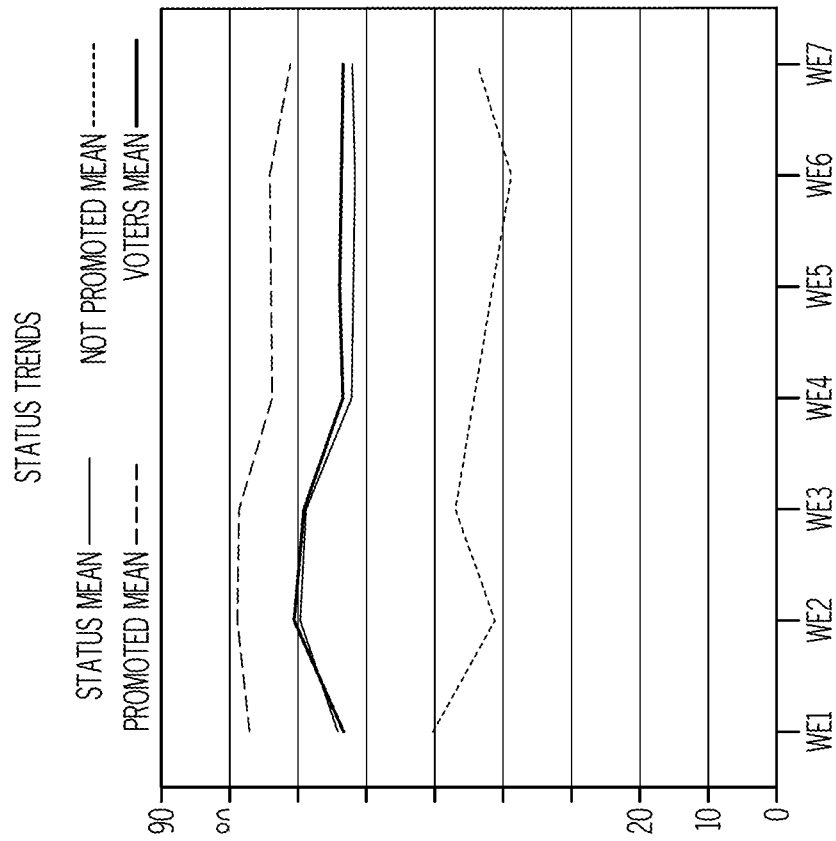
Figure 11:
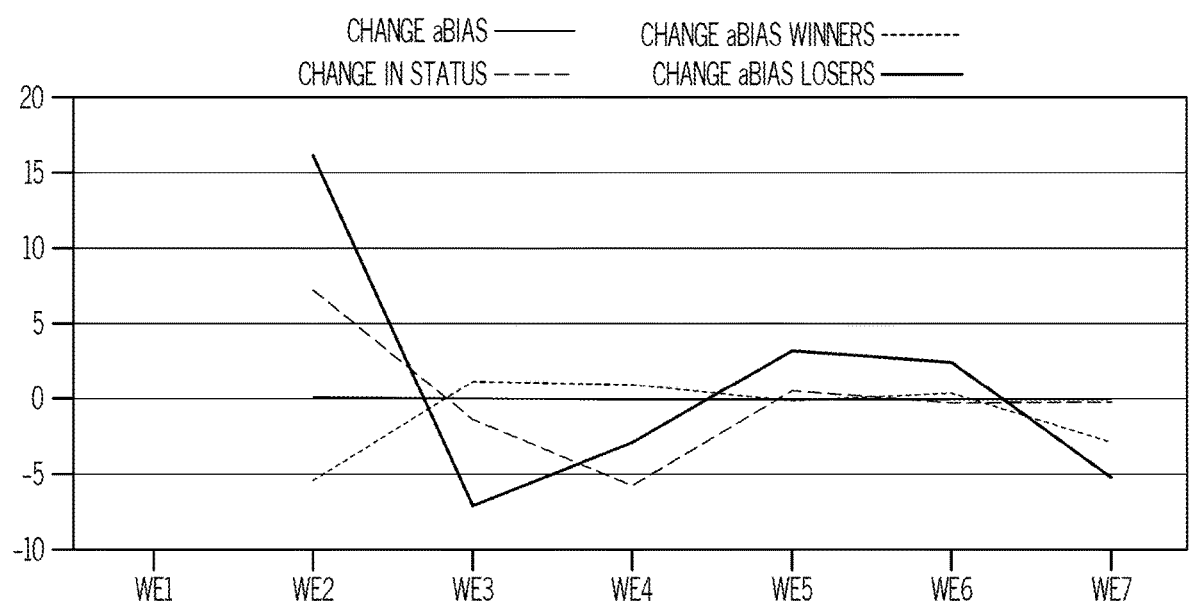
FIG. 11 illustrates the change in aBias, status, aBias winners and aBias losers in accordance with an embodiment of the present invention.

FIGS. 10A and 10B illustrate the status trends and the standard deviation status trends, respectively, in accordance with an embodiment of the present invention. FIG. 11 illustrates the change in aBias, status, aBias winners and aBias losers in accordance with an embodiment of the present invention.

FIGS. 10A-10B and 11 illustrate the conclusions from the statistical data analysis of promotion and rejection bands: the increase in positive bias results in increased stratification (separate) of promoted and not promoted status, and a mean status increasing and diverging for promoted and unpromoted status means. aBias also changes as the entire data trends to the center. WE1→WE2 shows that not-elected 704 and elected 703 drift apart (aBias goes up), WE2→WE3 shows them drift closer with aBias going down, and WE3→WE4 shows that the whole drift down with aBias going down.

Algorithmic decisions often result in scoring and ranking individuals to determine credit worthiness, qualifications for college admissions and employment, and compatibility as dating partners. While automatic and seemingly objective, ranking algorithms can discriminate against individuals and protected groups, and exhibit low diversity. Furthermore, ranked results are often unstable—small changes in the input data or in the ranking methodology may lead to drastic changes in the output, making the result uninformative and easy to manipulate. Similar concerns apply in cases where items other than individuals are ranked, including colleges, academic departments, or products. The present invention provides a safe, statistically significant path to graph network analysis, and it provides a way to analyze the clustering, recommendation, and ranking in a statistically neutral manner by reconstructing average reality for the graph. The present invention guarantees statistical parity over multiple graph balancing realities, and treats similar vertices in the similar manner.

In this manner, the present invention improves the ability to identify and quantify sentiment and promotion bias in social networks.

As stated above, attempts have been made to identify and quantify sentiment bias; however, such attempts have had limited success in accurately identifying and quantifying such sentiment bias. Such attempts to identify sentiment bias involve using sentiment analysis tools. Typically, such tools track sentiment by keywords and set up automated assignments by chosen keywords. For example, a sentiment analysis tool may scan for Tweets containing positive terms, such as "thank you" and "amazing." A sentiment analysis tool may also search for sentiment-indicating emojis, such as the thumbs up or smiley face. The bias of the sentiment may attempt to be determined based on the type of sentiment (positive or negative) expressed per topic, such as President Trump, conservatives, etc., by different publishers. However, it is questionable whether positive or negative sentiment on a topic necessarily represents bias toward or against that topic. Hence, such tools fail to provide the insight necessary for accurately identifying and quantifying sentiment bias. Additionally, such tools utilize an expansive amount of computing resources (e.g., processing resources).

In contrast, the present invention is able to more accurately identify and quantify sentiment and promotion bias by constructing balanced graphs associated with spanning trees corresponding to multiple views of a signed graph. Scores are assigned for each of the multiple views of the signed graph to determine an influence one group has over another group while maintaining agreement. An inequitable ratio of the assigned scores over agreeable sets of vertices of the signed graph is obtained. Based on the inequitable ratio of the assigned scores over agreeable sets of vertices of the signed graph, a more accurate sentiment and promotion bias is identified and quantified in contrast to currently existing sentiment analysis tools. Furthermore, fewer computing resources (e.g., processing resources) are needed to be utilized to identify and quantify a sentiment or promotion bias using the principles of the present invention. As a result, the functionality or capability of computing systems is improved. Computing resources (e.g., processing resources) are more efficiently utilized. Additionally, the speed of the analysis of sentiment or promotion bias is increased using the principles of the present invention.

Furthermore, the present invention improves the technology or technical field involving sentiment analysis tools. As discussed above, currently, sentiment analysis tools fail to provide the insight necessary for accurately identifying and quantifying such sentiment or promotion bias.

The present invention improves such technology by constructing balanced graphs associated with spanning trees corresponding to multiple views of a signed graph. Scores are assigned for each of the multiple views of the signed graph to determine an influence one group has over another group while maintaining agreement. An inequitable ratio of the assigned scores over agreeable sets of vertices of the signed graph is obtained. Based on the inequitable ratio of the assigned scores over agreeable sets of vertices of the signed graph, a more accurate sentiment and promotion bias is identified and quantified in contrast to currently existing sentiment analysis tools.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for detecting inequality in social networks, the method comprising:
   receiving a set of nodes that correspond to users or evaluated content;
   receiving a set of sentiments between said set of nodes as a measure of a group opinion, wherein said set of sentiments is expressed as a weight associated with an edge between two vertices in a graph;
   generating a probability graph by constructing all possible balanced graphs associated with spanning trees corresponding to multiple views of a signed graph using said set of sentiments, wherein said signed graph is a graph in which each edge has a positive or a negative sign, wherein said spanning graph is a subgraph that is a tree that includes all the vertices of said signed graph with a minimum possible number of edges;
   assigning scores for each of said multiple views of said signed graph to determine an influence one group has over another group while maintaining agreement;
   obtaining an inequitable ratio of said assigned scores over agreeable sets of vertices of said signed graph; and
   identifying and quantifying a sentiment bias based on said inequitable ratio of said associated scores over agreeable sets of vertices of said signed graph.

2. The method as recited in claim 1 further comprising:
   performing an agreeable cut of a balanced graph in response to said signed graph not being balanced.

3. The method as recited in claim 1, wherein said set of sentiments is correlated to a final state of nodes in terms of promotion, rating or not a target of promotion.

4. The method as recited in claim 1 further comprising:
   receiving a set of promotions for a subset of nodes in said social network; and
   computing an endorsement graph representation for said received set of promotions for said subset of nodes in said social network and for said received set of sentiments.

5. The method as recited in claim 1 further comprising:
   correcting a subset of opinions outside a spanning tree so that all cycles in a balanced graph agree thereby producing a new view where each node is in agreement on each outcome.

6. The method as recited in claim 1 further comprising:
   computing bias analysis parameters over agreeable realities.

7. The method as recited in claim 6 further comprising:
   producing a list of vertices whose promotion/no promotion does not agree with overall system fairness.

8. The method as recited in claim 7 further comprises:
   producing a structural system analysis of a promotion of bias in response to different timestamps of sociotechnical networks being available.

9. The method as recited in claim 7 further comprising:
   identifying node influencers based on their extended influence over network sentiment over time in response to different timestamps of sociotechnical networks not being available.

10. A computer program product for predicting promotion in social networks, the computer program product comprising a computer readable storage medium having program code embodied therewith, the program code comprising the programming instructions for:
    receiving a set of nodes that correspond to users or evaluated content;
    receiving a set of sentiments between said set of nodes as a measure of a group opinion, wherein said set of sentiments is expressed as a weight associated with an edge between two vertices in a graph;
    generating a probability graph by constructing all possible balanced graphs associated with spanning trees corresponding to multiple views of a signed graph using said set of sentiments, wherein said signed graph is a graph in which each edge has a positive or a negative sign, wherein said spanning graph is a subgraph that is a tree that includes all the vertices of said signed graph with a minimum possible number of edges;
    assigning scores for each of said multiple views of said signed graph to determine an influence one group has over another group while maintaining agreement;
    obtaining an inequitable ratio of said assigned scores over agreeable sets of vertices of said signed graph; and
    identifying and quantifying a sentiment bias based on said inequitable ratio of said associated scores over agreeable sets of vertices of said signed graph.

11. The computer program product as recited in claim 10, wherein the program code further comprises the programming instructions for:
    performing an agreeable cut of a balanced graph in response to said signed graph not being balanced.

12. The computer program product as recited in claim 10, wherein said set of sentiments is correlated to a final state of nodes in terms of promotion, rating or not a target of promotion.

13. The computer program product as recited in claim 10, wherein the program code further comprises the programming instructions for:
    receiving a set of promotions for a subset of nodes in said social network; and computing an endorsement graph representation for said received set of promotions for said subset of nodes in said social network and for said received set of sentiments.

14. The computer program product as recited in claim 10, wherein the program code further comprises the programming instructions for:
correcting a subset of opinions outside a spanning tree so that all cycles in a balanced graph agree thereby producing a new view where each node is in agreement on each outcome.

15. The computer program product as recited in claim 10, wherein the program code further comprises the programming instructions for:
computing bias analysis parameters over agreeable realities.

16. The computer program product as recited in claim 15, wherein the program code further comprises the programming instructions for:
producing a list of vertices whose promotion/no promotion does not agree with overall system fairness.

17. The computer program product as recited in claim 16, wherein the program code further comprises the programming instructions for:
producing a structural system analysis of a promotion of bias in response to different timestamps of sociotechnical networks being available.

18. The computer program product as recited in claim 16, wherein the program code further comprises the programming instructions for:
identifying node influencers based on their extended influence over network sentiment over time in response to different timestamps of sociotechnical networks not being available.

19. A system, comprising:
a memory for storing a computer program for predicting promotion in social networks; and
a processor connected to said memory, wherein said processor is configured to execute the program instructions of the computer program comprising:
receiving a set of nodes that correspond to users or evaluated content;
receiving a set of sentiments between said set of nodes as a measure of a group opinion, wherein said set of sentiments is expressed as a weight associated with an edge between two vertices in a graph;
generating a probability graph by constructing all possible balanced graphs associated with spanning trees corresponding to multiple views of a signed graph using said set of sentiments, wherein said signed graph is a graph in which each edge has a positive or a negative sign, wherein said spanning graph is a subgraph that is a tree that includes all the vertices of said signed graph with a minimum possible number of edges;
assigning scores for each of said multiple views of said signed graph to determine an influence one group has over another group while maintaining agreement;
obtaining an inequitable ratio of said assigned scores over agreeable sets of vertices of said signed graph; and
identifying and quantifying a sentiment bias based on said inequitable ratio of said associated scores over agreeable sets of vertices of said signed graph.

20. The system as recited in claim 19, wherein the program instructions of the computer program further comprise:
performing an agreeable cut of a balanced graph in response to said signed graph not being balanced.

21. The system as recited in claim 19, wherein said set of sentiments is correlated to a final state of nodes in terms of promotion, rating or not a target of promotion.

22. The system as recited in claim 19, wherein the program instructions of the computer program further comprise:
receiving a set of promotions for a subset of nodes in said social network; and
computing an endorsement graph representation for said received set of promotions for said subset of nodes in said social network and for said received set of sentiments.

23. The system as recited in claim 19, wherein the program instructions of the computer program further comprise:
correcting a subset of opinions outside a spanning tree so that all cycles in a balanced graph agree thereby producing a new view where each node is in agreement on each outcome.

24. The system as recited in claim 19, wherein the program instructions of the computer program further comprise:
computing bias analysis parameters over agreeable realities.

25. The system as recited in claim 24, wherein the program instructions of the computer program further comprise:
producing a list of vertices whose promotion/no promotion does not agree with overall system fairness.

26. The system as recited in claim 25, wherein the program instructions of the computer program further comprise:
producing a structural system analysis of a promotion of bias in response to different timestamps of sociotechnical networks being available.

27. The system as recited in claim 25, wherein the program instructions of the computer program further comprise:
identifying node influencers based on their extended influence over network sentiment over time in response to different timestamps of sociotechnical networks not being available.

* * * * *

UNITED STATES PATENT AND TRADEMARK OFFICE
CERTIFICATE OF CORRECTION

| | | |
|---|---|---|
| PATENT NO. | : 12,093,970 B2 | Page 1 of 1 |
| APPLICATION NO. | : 17/435299 | |
| DATED | : September 17, 2024 | |
| INVENTOR(S) | : Tesic et al. | |

It is certified that error appears in the above-identified patent and that said Letters Patent is hereby corrected as shown below:

In the Specification

Please replace "Indré Iiobaité," at Column 11, Line 37 with "Indré Žliobaité".

Signed and Sealed this
Nineteenth Day of November, 2024

Katherine Kelly Vidal
*Director of the United States Patent and Trademark Office*